United States Patent
Sammoura et al.

(10) Patent No.: US 8,438,923 B2
(45) Date of Patent: May 14, 2013

(54) MEMS DEVICE WITH OPPOSITE POLARITY SPRING BIMORPH

(75) Inventors: Firas Sammoura, Melrose, MA (US); Kuang Yang, Newton, MA (US)

(73) Assignee: Analog Devices, Inc., Norwood, MA (US)

( * ) Notice: Subject to any disclaimer, the term of this patent is extended or adjusted under 35 U.S.C. 154(b) by 478 days.

(21) Appl. No.: 12/413,196

(22) Filed: Mar. 27, 2009

(65) Prior Publication Data

US 2010/0242604 A1  Sep. 30, 2010

(51) Int. Cl.
*G01P 15/09* (2006.01)

(52) U.S. Cl.
USPC ........................................... 73/514.34

(58) Field of Classification Search ........... 73/514.34
See application file for complete search history.

(56) References Cited

U.S. PATENT DOCUMENTS

| | | | | |
|---|---|---|---|---|
| 3,034,345 | A * | 5/1962 | Mason ..................... | 73/862.623 |
| 6,895,645 | B2 * | 5/2005 | Xu et al. ..................... | 29/25.35 |
| 7,084,554 | B2 * | 8/2006 | Xu et al. ..................... | 310/332 |
| 7,231,874 | B2 * | 6/2007 | Rastegar et al. ............. | 102/207 |
| 7,414,351 | B2 * | 8/2008 | Ulm et al. .................... | 310/330 |
| 7,732,990 | B2 * | 6/2010 | Nishigaki et al. ............ | 310/331 |
| 7,948,153 | B1 * | 5/2011 | Kellogg et al. .............. | 310/339 |
| 2005/0104478 | A1 * | 5/2005 | Xu et al. ..................... | 310/331 |
| 2007/0228887 | A1 * | 10/2007 | Nishigaki et al. ............ | 310/332 |
| 2007/0284969 | A1 * | 12/2007 | Xu .............................. | 310/339 |
| 2008/0079333 | A1 * | 4/2008 | Ulm et al. .................... | 310/339 |

OTHER PUBLICATIONS

Akiyama, Morito, et al. *Influence of oxygen concentration in sputtering gas on piezoelectric response of aluminum nitride thin films*, American Institute of Physics, Applied Physics Letters 93, 021903 (2008) 3 pages.

Toshihiro, Kamohara, et al. *Influence of polar distribution on piezoelectric response of aluminum nitride thin films*, American Institute of Physics, Applied Physics Letters 92, 093506 (2008) 3 pages.

Toshihiro, Kamohara, et al. *Influence of sputtering pressure on polarity distribution of aluminum nitride thin films*, American Institute of Physics, Applied Physics Letters 89, 243507 (2006) 3 pages.

Akiyama, Morito, et al. *Polarity inversion in aluminum nitride thin films under high sputtering power*, American Institute of Physics, Applied Physics Letters 90, 151910 (2007) 3 pages.

* cited by examiner

*Primary Examiner* — Freddie Kirkland, III
(74) *Attorney, Agent, or Firm* — Sunstein Kann Murphy & Timbers LLP

(57) ABSTRACT

A MEMS device has a mass supported at least in part by a spring. Among other things, the spring has first and second layers, and first and a second electrodes. The first and second layers are between the first and second electrodes, and the first and second layers, which are oppositely polarized, form a bimorph.

9 Claims, 4 Drawing Sheets

MEMS DEVICE WITH OPPOSITE POLARITY SPRING BIMORPH

FIELD OF THE INVENTION

The invention generally relates to MEMS devices and, more particularly, the invention relates to piezoelectric MEMS sensing devices.

BACKGROUND OF THE INVENTION

Engineers and scientists have designed microelectromechanical systems ("MEMS" or "MEMS devices") to perform a wide variety of functions. Among other things, such devices can sense acceleration or rotational movement, redirect light data signals between optical fibers, detect pressure changes, or transform an acoustic signal into an electric signal. These diverse devices commonly interact with their internal microstructure (e.g., detecting microstructure movement or actuating microstructure) using electrostatics or piezoelectrics.

MEMS devices using piezoelectrics to detect movement (e.g., an accelerometer) can employ a bimorph structure as a spring to support its corresponding mass above a substrate. Specifically, by way of example, FIG. 1A schematically shows a part of a prior art accelerometer 10P having a bimorph spring 12P supporting a mass 14P above a substrate 16P. As shown, the spring 12P has five distinct layers; namely, a middle electrode 18P between top and bottom polarized layers 20P and 22P, and two exterior electrodes 24P and 26P respectively on the top and bottom of the two polarized layers 20P and 22P. The two polarized layers 20P and 22P have the same polarity at rest.

Movement of the mass in the positive Z-direction, which, in this example, is generally orthogonal to and toward the substrate, causes one of the polarized layers 20P or 22P to compress while the other polarized layer expands 20P or 22P. This causes the first and second polarized layers 20P and 22P to have the electrical pattern shown in FIG. 1B (schematically showing the spring 12P only). The strength of those electric fields is a function of the compression/expansion of the respective polarized layers 20P and 22P. A signal detector 28P connected between the middle electrode 18P and one of the exterior electrodes 24P or 26P detects a degree of change in polarity, indicating qualities of the movement of the mass 14P.

To the knowledge of the inventors, many in the art consider this design to operate satisfactorily. In contrast, the inventors believe that future technological demands may limit the applicability of this prior art design across many current and emerging applications.

SUMMARY OF THE INVENTION

In accordance with one embodiment of the invention, a MEMS device has a bimorph with oppositely polarized layers. Specifically, the MEMS device has a mass supported at least in part by a spring. Among other things, the spring has first and second layers, and first and a second electrodes. The first and second layers are between the first and second electrodes, and the first and second layers, which are oppositely polarized, form a bimorph.

For added functionality, the MEMS device also may have a signal detector between the first electrode and the second electrode. The signal detector detects at least one of a) a voltage difference between the first and second electrodes, or b) a current between the first and second electrodes. The MEMS device further may have a substrate with a top surface. In that case, the spring may support the mass above the substrate, and the bimorph produces a signal (when moved) indicating the displacement of the mass in a direction that is generally orthogonal to the top surface of the substrate.

The first and second layers may be formed from a suitable material, such as aluminum nitride. The device may implement the functionality of a number of different machines, such as an accelerometer or a gyroscope. The spring and mass may form at least a part of an accelerometer (or gyroscope).

Some embodiments also have a middle electrode between the first and second layers. Thus, the MEMS device may also have an electrical interface to the middle electrode. Such an interface additionally may permit X and Y sensing. During use, the first layer may compress while the second layer expands. In that case, the electrical signal between the first and second electrodes is greater than an electrical signal between the first electrode and middle electrode.

The spring may be coupled with the mass about the outer periphery of the mass.

For example, the spring and mass may form a cantilever. Alternatively, the MEMS device may have a plurality of springs about the outer periphery of the mass. Each of at least two of those springs may have a bimorph of oppositely polarized layers.

In accordance with other embodiments of the invention, a MEMS sensor has a substrate, a mass, and a piezoelectric spring movably suspending the mass above the substrate. The spring has first and second layers of opposing polarities when at rest. The first layer has a first interior surface and an opposing first exterior surface. In a corresponding manner, the second layer has a second interior surface and an opposing second exterior surface. The first and second interior surfaces are positioned between the first and second exterior surfaces. To facilitate reception of a signal, the first exterior surface has a first electrode, and the second exterior surface has a second electrode.

In accordance with another embodiment of the invention, a method of detecting an acceleration provides a mass suspended above a substrate by a piezoelectric spring having first and second oppositely polarized layers when at rest. The spring has a spring constant that permits the mass to move in at least one direction relative to the substrate in response to an acceleration. The mass moves in response to an acceleration, which causes the first layer to compress to have a first polarity and the second layer to expand to have the same polarity. The method then measures a signal across the first and second layers. The acceleration is a function of the signal measured across the layers.

The signal may be a function of the voltage difference between the first and second layers. For example, the signal may be a voltage, a current, or a power signal. Some embodiments position a first outside electrode and a second outside electrode on the spring. The two layers are positioned at least in part between these outside electrodes. The signal is measured from those first and second outside electrodes.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

In illustrative embodiments, a MEMS device has a bimorph spring formed from two normally opposite-polarity layers. Accordingly, during use, when one layer is compressed and the other layer is stretched, the voltage potential of the two layers has an additive relationship. Consequently, such a spring should provide a greater signal-to-noise ratio than the above noted prior art bimorph springs (i.e., those that require a voltage reading across a single layer only). Moreover, such embodiments simplify fabrication processes by not requiring a connection to an often buried, middle electrode. Details of various embodiments are discussed below.

Principals of illustrative embodiments apply to a number of different MEMS devices. To that end, among other things, they may apply to MEMS devices configured as inertial sensors, such as accelerometers and gyroscopes, optical switches, pressure sensors, and microphones. To simplify the discussion, however, illustrative embodiments are discussed in terms of a specific MEMS sensor; namely a cantilevered accelerometer. MEMS engineers thus can apply various principals of illustrative embodiments, when appropriate and within their technical expertise, to other MEMS devices. For example, various embodiments also apply to other types of sensors, such as non-cantilevered accelerometers, or gyroscopes with and without cantilevers.

Figure 2:
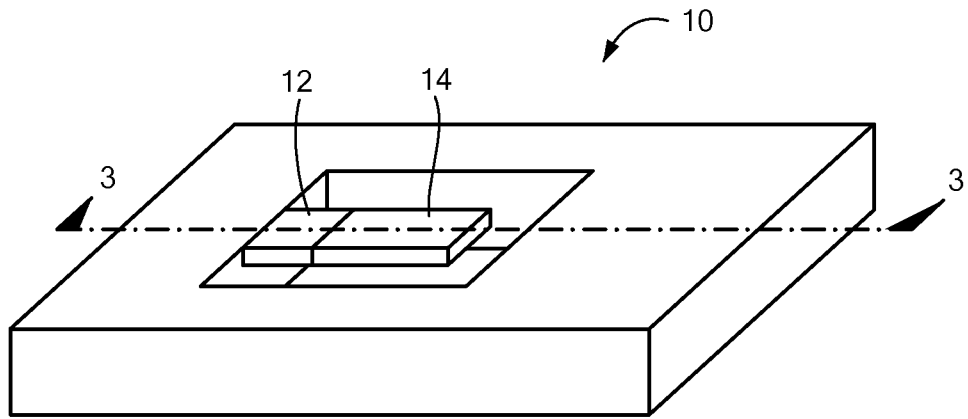
FIG. 2 schematically shows a perspective view of one type of accelerometer that may implement illustrative embodiments of the invention.
Figure 3:
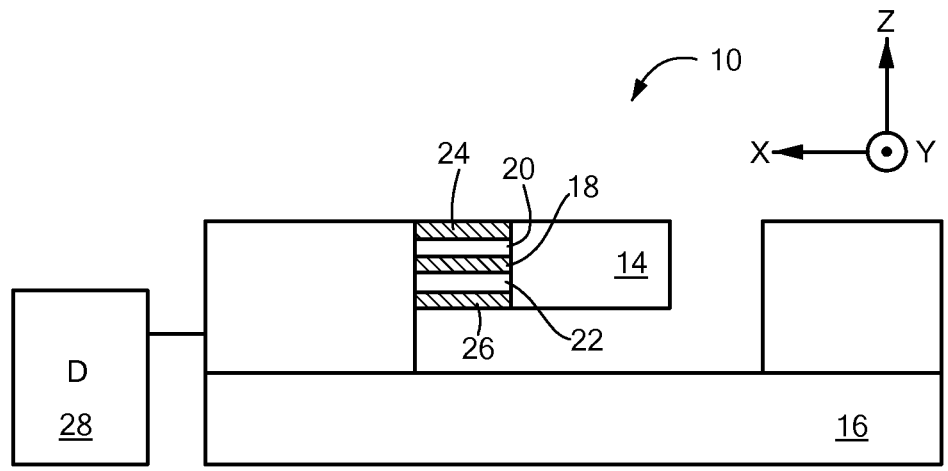
FIG. 3 schematically shows a cross-sectional view of the accelerometer shown in FIG. 2 across line 3-3.

FIG. 2 schematically shows a perspective view of one type of accelerometer 10 that may implement illustrative embodiments of the invention. FIG. 3 schematically shows a cross-sectional view of the same accelerometer 10 across line 3-3 of FIG. 2. As noted above, the accelerometer 10 has a spring 12 that suspends a movable mass 14 above a substrate 16 in a cantilevered manner. The accelerometer 10 generally generates a signal representative of movement of the mass 14 in a direction that is generally toward or away from the underlying substrate 16. As such, those skilled in the art would referred to as type of accelerometer 10 as a "Z-axis" accelerometer.

More specifically, the spring 12 has a prescribed flexibility/spring constant that permits the mass 14 to move generally upwardly or downwardly, in a cantilevered manner, toward or away from the substrate 16. Acceleration of the substrate 16, and its underlying apparatus, is a function of the mass movement. To that end, in addition to supporting the mass 14, the spring 12 also has piezoelectric properties that enable detection circuitry (shown schematically in FIG. 3 only) to detect movement of the mass 14. More particularly, as discussed in greater detail below and mentioned above, the spring 12 is a multilayer bimorph having a unique polarization pattern.

Figure 1A:
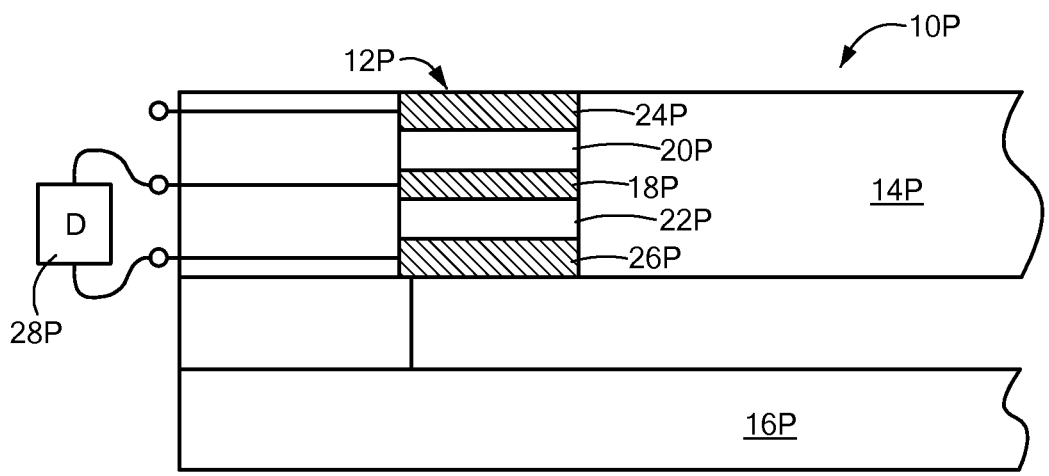
FIG. 1A schematically shows a cross-sectional view of a prior art accelerometer.
Figure 1B:
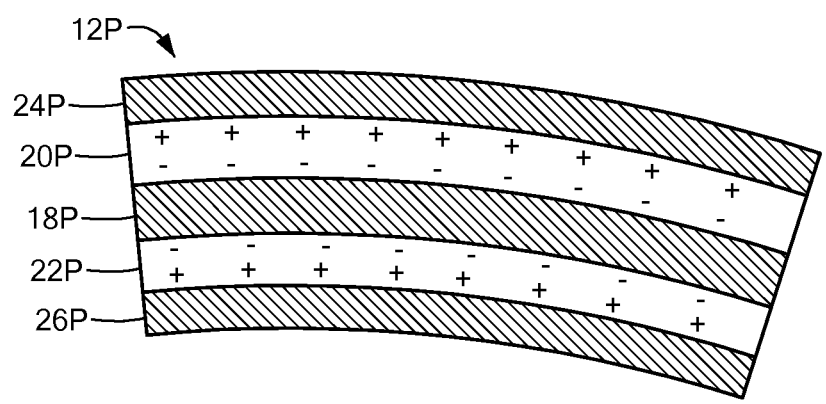
FIG. 1B schematically shows the spring of the accelerometer of FIG. 1A in a flexed state.

The inventors realized that prior art bimorph springs, such as those discussed above with regard to FIGS. 1A and 1B, suffered deficiencies that may not be readily apparent to others skilled in the art. Specifically, prior art springs may not provide a signal of sufficient amplitude for lower power applications because they deliver a voltage across one layer only. To the knowledge of the inventors, those skilled in the art have not acknowledged this problem, nor suggested improving the signal-to-noise ratio.

Figure 4A:
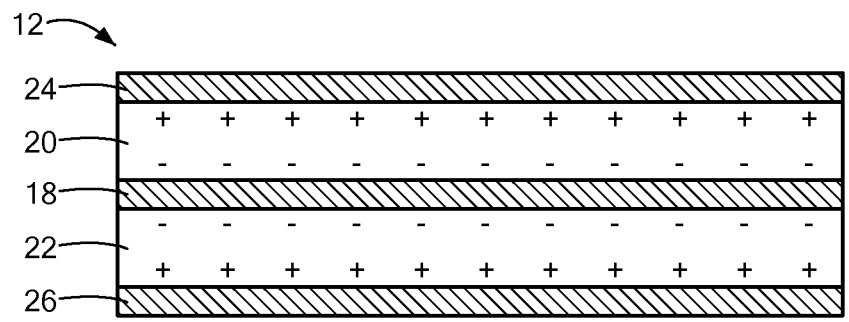
FIG. 4A schematically shows an enlarged view of the spring in the accelerometer shown in FIG. 3, with the spring in an at-rest state.

Accordingly, in illustrative embodiments of the invention, the spring 12 is a multilayered bimorph structure having at least two layers that are normally oppositely polarized. To that end, FIG. 4A schematically shows an enlarged cross-sectional view of the spring 12 when at rest. As shown, the spring 12 has a center/middle electrode 18, top and bottom (active/polarized) layers 20 and 22 on either side of the center electrode 18, and top and bottom electrodes 24 and 26 respectively on the top and bottom layers 20 and 22. It should be noted that special terminology, such as "top," "bottom," "up," "center," "middle," and "down," are from the perspective of the drawings only; those terms are used merely to simplify the discussion and not intended to limit various embodiments or imply exact points (i.e., "center" is not necessarily intended to mean exactly in the center).

The electrodes 18, 24 and 26 may be formed from any metal sufficient for the intended purpose, such as titanium tungsten or platinum. The top and bottom layers 20 and 22 also may be formed from a material sufficient for the intended purposes, such as aluminum nitride. As shown in FIG. 4A, when at rest, the top layer 20 has a polarity with a negative charge in the middle of the bimorph, and a positive charge near the top and bottom edges. It should be noted, however, that an opposite polarity also should suffice. Discussion of the specific polarity merely is for illustrative purposes only.

Figure 4B:
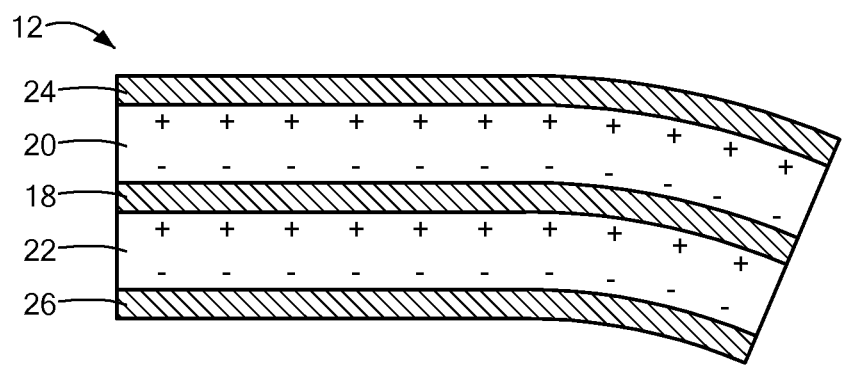
FIG. 4B schematically shows an enlarged view of the spring in the accelerometer shown in FIG. 3, with the spring flexed downwardly.

FIG. 4B schematically shows the same bimorph spring 12 of FIG. 4A stressed generally downwardly. As shown, the top layer 20 stretches downwardly while the bottom layer 22 compresses. Consequently, the polarity of the top layer 20 remains the same while polarity of the bottom layer 22 changes. As noted above, this polarity switch has an additive effect to the voltage across the entire bimorph (i.e., between the top and bottom electrodes 24 and 26). In other words, the inventors anticipate that the signal between the top and bottom electrodes 24 and 26 will be greater than the signal between the middle electrode 18 and either one of the top and bottom electrodes 24 and 26.

Figure 4C:
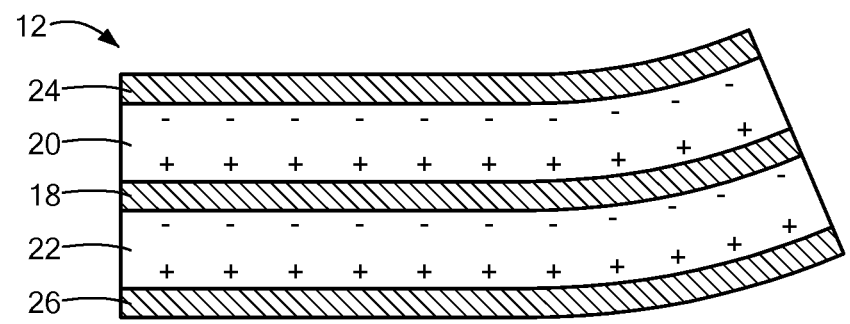
FIG. 4C schematically shows an enlarged view of the spring in the accelerometer shown in FIG. 3, with the spring flexed upwardly.

In a similar manner, FIG. 4C schematically shows the same bimorph spring 12 of FIG. 4A stressed generally upwardly. As shown, the top layer 20 compresses while the bottom layer 22 stretches—the opposite result from that shown in FIG. 4B. Consequently, the polarity of the top layer 20 changes while polarity of the bottom layer 22 remains the same. Accordingly, when stressed generally upwardly, this polarity switch has an additive effect of the voltage across the entire bimorph.

As noted above, FIG. 3 schematically shows a detector 28 that, when connected to the top and bottom electrodes 24 and 26, reads the voltage across bimorph. For example, the detector 28 may detect a signal (e.g., a current signal) that is proportional to the voltage between the top and bottom electrodes 24 and 26. To that end, the detector 28 simply connects to both top and bottom electrodes 24 and 26, which should be readily accessible. This is in contrast to the prior art bimorph design of FIGS. 1A and 1B, which requires access to the middle electrode 18—an electrode that typically is generally inaccessible absent additional fabrication steps. Accordingly, in addition to providing an improved signal-to-noise ratio, various embodiments simplify device fabrication, thus reducing overall part cost.

Although its function is not discussed above, the middle electrode 18 can serve various purposes. For example, it facilitates current flow between the top and bottom layers 20 and 22. In addition, despite mitigating one benefit of the design, it still can be electrically accessed to detect motion in a direction that is generally parallel to the substrate 16 (i.e., in the X-direction and the Y-direction). Accordingly, various embodiments may be implemented not only in Z-axis sensors, but also in X-axis and Y-axis sensors. In fact, various embodiments also apply to 2-dimensional and 3-dimensional sensors.

Figure 5:
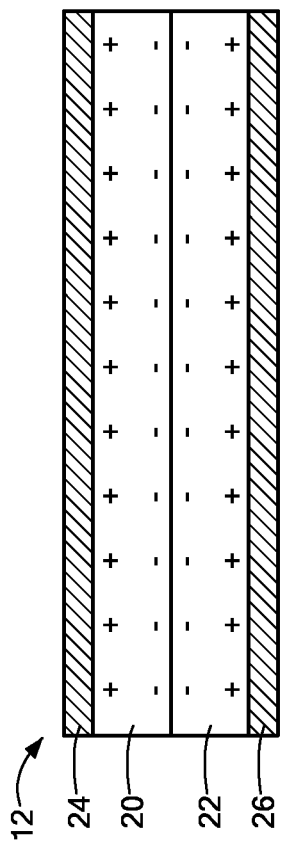
FIG. 5 schematically shows an alternative embodiment of the spring shown in FIGS. 4A-4C.

Alternative embodiments may omit the middle electrode 18. Specifically, FIG. 5 schematically shows the spring 12 without the middle electrode 18. Yet other embodiments may include additional electrodes or layers as dictated by the desired application.

Figure 6:
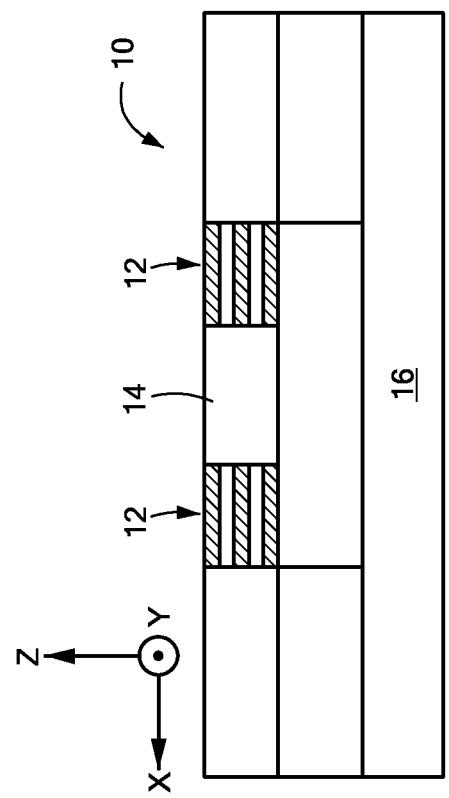
FIG. 6 schematically shows a cross-sectional view of an accelerometer implementing an alternative embodiment of the invention.

As noted above, various embodiments are not limited to cantilevered microstructure. For example, FIG. 6 schematically shows an alternative accelerometer 10 having at least two bimorph springs 12 supporting the mass 14 at its periphery above the substrate 16. Depending on the application, the springs 12 of this embodiment can have the middle electrode 18, or omit the middle electrode 18. Accordingly, this accelerometer 10 may detect movement in one or more of the X-direction, Y-direction, or Z-direction.

Figure 7:
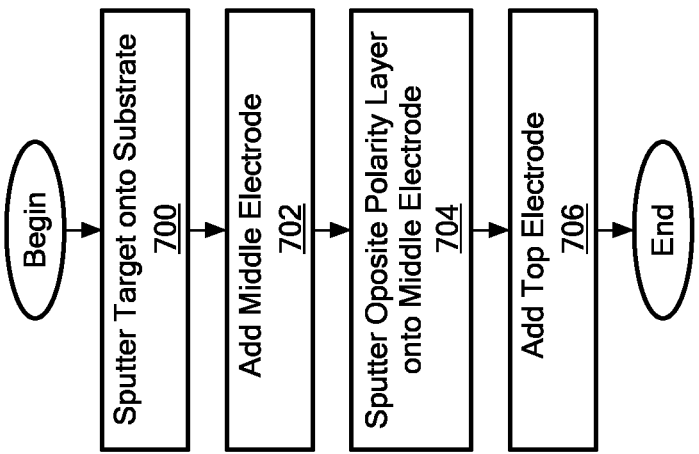
FIG. 7 shows a process of forming a bimorph spring in accordance with illustrative embodiments of the invention.

FIG. 7 shows one of many possible processes of forming the bimorph spring 12 in accordance with illustrative embodiments of the invention. It should be noted that for simplicity, this process omits discussion of fabricating the overall accelerometer 10, focusing primarily on the bimorph spring 12. Even with that simplification, this process only generally describes a generalized process of forming the bimorph spring 12 and thus, omits granular details of the process that one skilled in the art can readily apply.

The process begins at step 700, which sputters a target material onto a substrate to form the bottom layer 22. To that end, as with many MEMS fabrication processes, this and other steps start with a base material, such as titanium tungsten or platinum (noted above), that forms the bottom electrode 26. While in a nitrogen gas environment, conventional processes may sputter aluminum from an aluminum target onto the substrate. Consequently, the bottom electrode 26 supports the bottom layer 22, which, in this embodiment, is formed from aluminum nitride.

As discussed above, this bottom layer 22 has a certain polarity, which is a function of its fabrication. For example, one or more of the nitrogen flow rate, the oxygen content in the deposition chamber, pressure in the chamber, and deposition power are controlled to produce the desired polarity across the bottom layer 22.

Next, the process adds the middle electrode 18 to the top of the bottom layer 22 (step 702), and then sputters the top layer 20 onto the top surface of the middle electrode 18 (step 704). In a manner similar to step 700, this step also may sputter aluminum from an aluminum target onto the exposed middle electrode 18 in a nitrogen atmosphere. As noted throughout, this top layer 20 normally has a polarity that is opposite to that of the bottom layer 22. Accordingly, as with the bottom layer 22, one or more of the nitrogen flow rate, the oxygen content in the deposition chamber, pressure in the chamber, and deposition power are controlled to produce the desired polarity across the top layer 20.

The process concludes at step 706, which adds the top electrode 24. It should be noted that discussion of specific materials (e.g., aluminum, nitrogen, platinum and titanium tungsten) are for illustrative purposes only. Those skilled in the art therefore can use other materials as permitted by the application.

Accordingly, when used to detect Z-direction movement, the cantilevered accelerometer 10 of FIGS. 2 and 3 compresses one layer 20 or 22 while stretching the other layer 20 or 22. One skilled in the art therefore can take advantage of the full polarity of the entire bimorph spring 12, thus improving signal-to-noise ratio while not requiring access to the middle electrode 18. When used to detect X-direction or Y-direction movement, both layers 20 and 22 either compress or stretch and thus, access to the middle electrode 18 should provide the appropriate, but lower data signals.

Although the above discussion discloses various exemplary embodiments of the invention, it should be apparent that those skilled in the art can make various modifications that will achieve some of the advantages of the invention without departing from the true scope of the invention.

What is claimed is:

1. A MEMS inertial sensor comprising:
   a substrate;
   a mass; and
   a piezoelectric spring movably suspending the mass above the substrate, the spring being formed on the substrate by sputter etching and having first and second layers of opposing polarities when at rest, the first layer having a first interior surface and an opposing first exterior surface, the second layer having a second interior surface and an opposing second exterior surface, the first and second interior surfaces being between the first and second exterior surfaces, the first exterior surface having a first electrode, the second exterior surface having a second electrode, the mass being structurally different from the spring.

2. The MEMS sensor as defined by claim 1 wherein the first and second layer comprise aluminum nitride.

3. The MEMS sensor as defined by claim 1 further comprising an electrical conductor between the first and second interior surfaces.

4. The MEMS sensor as defined by claim 1 further comprising a signal detector between the first electrode and the second electrode, the signal detector detecting a signal proportional to the voltage between the first and second electrodes.

5. The MEMS sensor as defined by claim 4 wherein the signal detector detects a voltage between the first and second electrodes.

6. A method of detecting an acceleration, the method comprising:
   providing a MEMS inertial sensor comprising a mass suspended above a substrate by a piezoelectric spring, the spring being formed by sputter etching processes that sputter the spring onto the substrate, the piezoelectric spring having first and second oppositely polarized layers when at rest, the spring having a spring constant that permits the mass to move in at least one direction relative to the substrate in response to an acceleration, the mass being structurally different from the spring;
   the mass moving relative to the substrate in response to an acceleration, the movable mass causing the first layer to compress to have a first polarity, the movable mass causing the second layer to expand to have the same polarity; and measuring a signal across the first and second layers, the acceleration being a function of the signal measured across the layers.

7. The method as defined by claim 6 wherein the spring also has a first outside electrode and a second outside electrode, the two layers being at least in part between the first and second outside electrodes, the signal being measured from the first and second outside electrodes.

8. The method as defined by claim 6 wherein the signal is a function of the voltage difference between the first and second layers.

9. The method as defined by claim 6 wherein the spring has a middle electrode between the first and second layers, the middle electrode being physically inaccessible to the exterior of the spring.

* * * * *